Feb. 10, 1959    F. A. HANSEN ET AL    2,872,938
RELIEF VALVE
Filed April 12, 1956    2 Sheets-Sheet 1

FRANKLIN A. HANSEN &
JOHN H. BOETJER

*INVENTORS*

BY *Jack R. Springgate*
ATTORNEY

Feb. 10, 1959   F. A. HANSEN ET AL   2,872,938
RELIEF VALVE

Filed April 12, 1956   2 Sheets-Sheet 2

FRANKLIN A. HANSEN &
JOHN H. BOETJER
*INVENTORS*

BY
ATTORNEY

United States Patent Office 2,872,938
Patented Feb. 10, 1959

2,872,938
RELIEF VALVE

Franklin A. Hansen and John H. Boetjer, Kansas City, Mo., assignors to Black, Sivalls & Bryson, Inc., Kansas City, Mo., a corporation of Delaware Application April 12, 1956, Serial No. 577,782

4 Claims. (Cl. 137—493.9)

The present invention relates to valves for relieving internal pressures and vacuums that tend to occur in storage tanks. Specifically, the present invention relates to a new and novel floating valve plug which is self sealing under conditions of pressure and vacuum less than the predetermined pressure and vacuum relief setting.

Valves of this type operate as safety relief devices to protect storage tanks from damage caused by excessive pressures and vacuums and are utilized to conserve vapors of volatile liquids such as gasoline and other hydrocarbons which would be lost if stored in tanks open to the atmosphere. Prior devices of this type have a tendency to leak and chatter when the predetermined opening pressure of the valve is approached. Also, these devices have not had the full relieving capacity upon initial opening but have required additional pressure or vacuum build-up to cause complete opening and allow full relieving. These prior devices also have a tendency to remain open until the tank pressure drops far below the predetermining opening pressure thereby causing a loss of a considerable portion of the valuable vapors from the storage tank.

Therefore, the primary object of the present invention is to provide an improved device which will relieve pressures and vacuums in tanks at predetermined pressure settings. Further objects of the present invention are to provide a pressure and vacuum relieving device having improved sealing characteristics under conditions of pressure and vacuum approaching the predetermined relieving condition; to provide a pressure and vacuum relieving device which will afford a maximum pressure relief upon initial opening; to provide a pressure and vacuum relieving device which, after opening, will close as soon as the desired relieving is accomplished, thereby preventing excessive loss of vapors; and to provide a pressure and vacuum relieving device having a single floating plug member which affects a positive seal under conditions of pressure and vacuum less than the predetermined relieving conditions.

In accomplishing these and other objects of the invention we have provided details of structure, the preferred form of which is illustrated in the accompanying drawing wherein.

Figure 1:
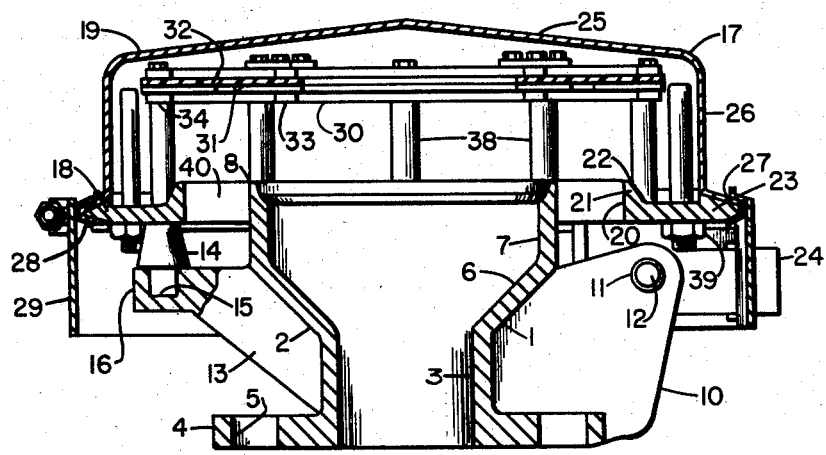
Fig. 1 is a full sectional view taken along a diameter of our improved pressure and vacuum relieving device illustrating the position of the device during vacuum relief.

Referring more in detail to the drawing:

1 designates our preferred form of pressure and vacuum relief valve which includes a body 2, having an annular wall 3 terminating at its lower edge in a flange 4 which has bolt holes 5 to provide connection to a vessel on which relief valve 1 is to be installed. The upper portion of wall 3 terminates in an outwardly flaring portion 6 having an upstanding annular rib 7 forming a circular seat 8 encircling the relief outlet opening 9 through the valve body 2.

Formed integrally with the valve body 2 are two body hinge lugs 10 extending outwardly from annular wall 3 in parallel spaced relationship to each other, each having a hole 11 drilled near its upper and outer extremity to receive hinge pin 12.

Diametrically opposite the body hinge lugs 10, a single bumper supporting bracket 13 extends outwardly from the valve body 2. A resilient bumper 14 or a plurality of bumpers 14 are installed in the recess 15 of the bumper receiving member 16 which is formed as an integral portion of the bumper supporting bracket 13 at its outer extremity. As may be clearly seen in Figs. 1 and 2, the portion of the bumper 14 which extends above the recess 15 is frusto-conical in shape to provide maximum resilience with minimum deformation.

Figure 2:
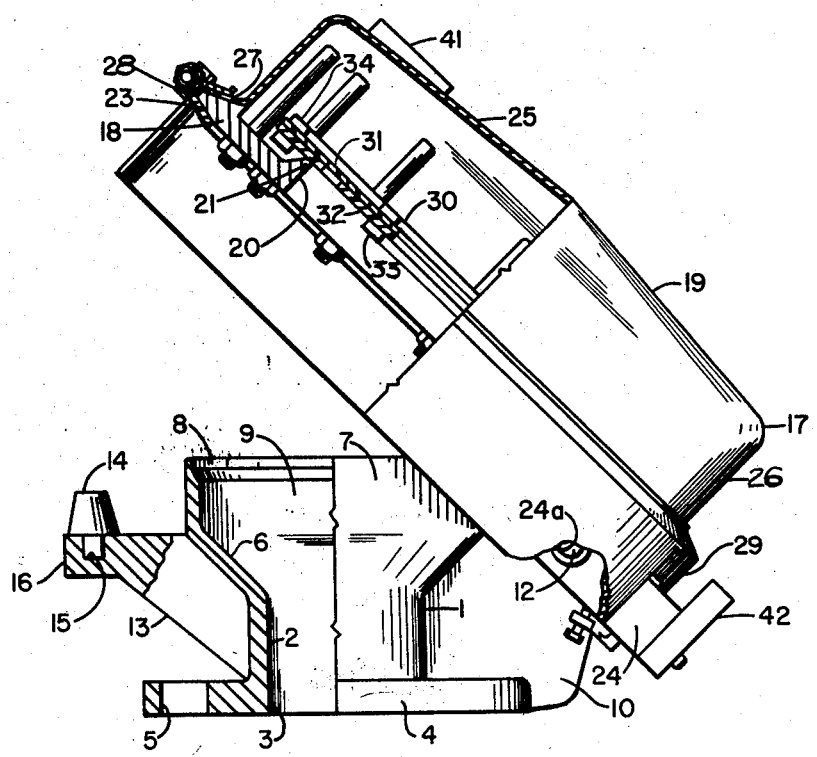
Fig. 2 is a similar full sectional view of our improved pressure and vacuum relieving device illustrating the position of the device during pressure relief.
Figure 3:
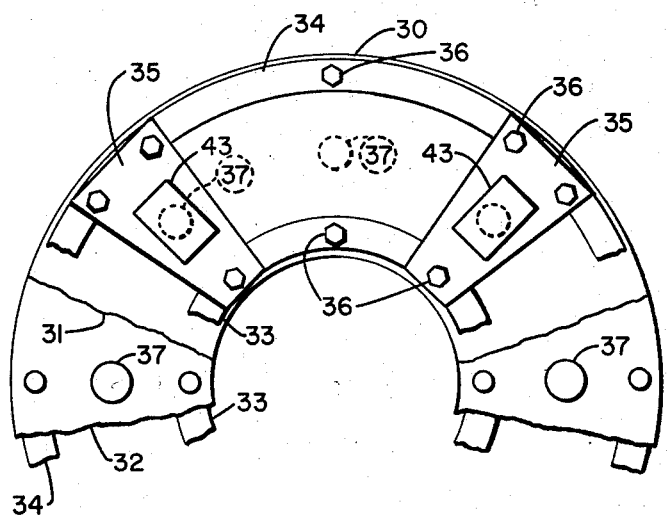
Fig. 3 is a partial view of the upper side of the floating plug member of our improved device.

A cover 17 composed of a cover base 18 and a bonnet 19 is positioned over the relief opening 9. The cover base 18 is spaced radially from the circular seat 8 and comprises a substantially flat annular ring portion 20 having an upstanding flange 21 around its inner periphery providing a seat 22 and a tapered section 23 around its outer periphery providing an anchoring surface for bonnet 19. Depending from the under side of ring portion 20 of cover base 18 are two cover hinge lugs 24 which are parallel to and in close spaced relationship with the body hinged lugs 10, each of the cover hinge lugs 24 being exterior of its corresponding body hinge lug 10. Holes 24a shown in Fig. 2 are drilled in cover hinge lugs 24 to receive hinge pin 12. Thus, cover 17 is fixed in a pivoting relationship with valve body 2 by hinge pin 12.

Bonnet 19 has a central top portion 25 which is slightly conical in shape to provide structural rigidity and allow bonnet 19 to be constructed of a relatively thin, lightweight material. Depending from central portion 25 is an annular wall 26 terminating in an outwardly and downwardly flared annular flange 27 which is held on tapered portion 23 of cover base 18 by the action of annular quick-opening wedge clamp 28. Clamp 28 is shown supporting a downwardly depending cylindrical weather hood 29 which provides protection for valve seats 8 and 22 and valve plug 30 from the adverse effects of weather.

Valve plug 30 is composed of upper annular diaphragm member 31, lower annular seating member 32, inner annular clamp rings 33, outer annular clamp rings 34, brackets 35 and bolts 36 securing the components together. Holes 37 are provided in the central portion of lower annular sealing member 32.

Vertical risers 38 are secured to cover base 18 by nuts 39. These risers 38 serve to position valve plug 30 over relieving area 40 between annular seats 8 and 22 and to assure proper transverse positioning of valve plug 30 on or above seats 8 and 22.

It should be noted that cover base 18 is hinged to valve body 2 on one side and supported by bumper 14 on the other side in a position causing seats 8 and 22 to lie substantially in a single horizontal plane. Minor misalignment of seats 8 and 22 will not effect the seating of plug 30 as diaphragm member 31 and seating member 32 are sufficiently resilient to provide a positive seating under such conditions.

The proper opening pressure may be assured by cover weight 41, cover counter-weight 42, valve plug weights 43 and any combination of these weights, each positioned as shown in the drawings and suitably secured in such positions. Cover counter-weights 42 are not needed except for installations requiring pressure relieving at minute pressure. Thus, as a result of the simple, light-weight construction of this present device, pressure relieving at small pressure differentials may be obtained without counter-weights.

The operation of pressure and vacuum relief valve 1 during vacuum relief is best illustrated in Fig. 1. Valve plug 30 has floated up above seats 8 and 22 into a position near the top of bonnet 19. Thus, since valve plug 30 no longer obstructs the flow between relief outlet opening 9 and relieving area 40 the atmospheric pressure external of valve 1 flows in through relieving area 40, relief outlet opening 9 and down through valve body 2 to relieve the vacuum in the tank being protected. Valve plug weights 43 are designed and installed on valve plug 30 to hold valve plug 30 on seats 8 and 22 until the desired vacuum relieving condition is obtained above valve plug 2 within bonnet 19 and in relief outlet opening 9.

Fig. 2 best illustrates the position of pressure and vacuum release valve 1 during pressure relief. Valve cover 17, including cover base 18 and bonnet 19, pivots upwardly about hinge pin 12 thereby uncovering relief outlet opening 9 and allowing the venting of pressure within the tank being protected through relief outlet opening 9 to the atmosphere. Cover 17 will remain in the open position as shown in Fig. 2 until the pressure within the tank being relieved has dropped to a point below the predetermined pressure relief setting. The flow of air out through relief outlet opening 9 is of sufficient velocity and volume to hold cover 17 open during the necessary period of pressure relief.

Figure 4:
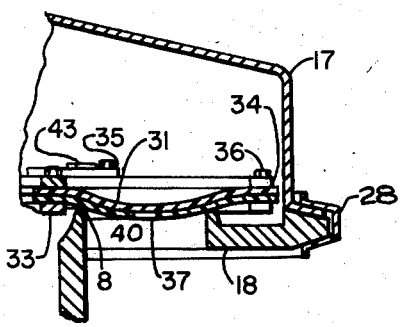
Fig. 4 is a partial diagrammatic view of our improved pressure and vacuum relieving device illustrating the device under conditions of pressure approaching the predetermined pressure relief condition.
Figure 5:
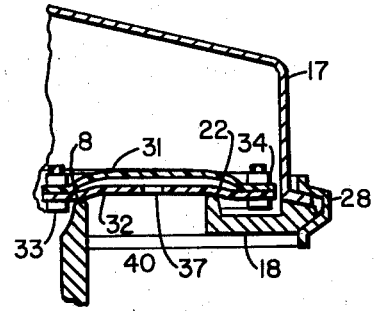
Fig. 5 is a partial diagrammatic view of our improved pressure and vacuum relieving device illustrating the position of the floating plug member under conditions of vacuum approaching the predetermined vacuum relieving condition.

One of the most important features of the present invention is the sealing of valve plug 30 on seats 8 and 22 under conditions approaching the predetermined pressure or vacuum relief setting. This novel seal and the novel structure of valve plug 30 which accomplishes this seal are best illustrated in Figs. 4 and 5. As previously explained, Fig. 4 is a partial diagrammatic view illustrating the seating of valve plug 30 on seats 8 and 22 during conditions of pressure approaching the predetermined pressure at which pressure relief is desired. The pressure differential between the pressure within cover 17 and atmospheric pressure of valve 1 exerts a force on upper annular diaphragm member 31. It forces diaphragm member 31 against lower annular seating member 32 thereby causing seating member 32 to be held firmly in place on seats 8 and 22 under all pressures less than the predetermined relieving pressure.

Fig. 5 is a partial diagrammatic view of the present invention illustrating the seating of valve plug 30 when conditions of vacuum occur within cover 17. This vacuum within cover 17 will cause a pressure differential to occur across diaphragm member 31 and seating member 32 tending to lift valve plug 30 away from seats 8 and 22. The greater atmospheric pressure flows through holes 37 in seating member 32, into the space between seating member 32 and diaphragm member 31. This pressure is exerted at the outer and inner peripheries of the space between seating member 32 and diaphragm member 31 and forces the inner and outer peripheries of seating member 32 to engage seats 8 and 22 respectively. It has been found by test that this positive seating of valve plug 30 on seats 8 and 22 will hold valve plug 30 to such position until the predetermined vacuum at which relief is desired occurs within valve 1.

Thus, it may be seen from the foregoing description that we have provided an improved pressure and vacuum relieving device having a positive seating. Also, we have provided an improved valve plug for a pressure and vacuum relieving device which affords positive seating under all conditions of pressure and vacuum approaching conditions at which relief is desired.

What we claim and desire to secure by Letters Patent is:

1. In a pressure and vacuum relief valve comprising a valve body having an annular upstanding seat, a cover, a cover base having an annular upstanding seat spaced radially from and level with said annular seat on said valve body, means movably connecting said cover base to said valve body, the improvement including an annular floating valve plug positioned on said upstanding seats when seated comprising an upper annular diaphragm member, a lower annular seating member, clamping means securing the inner and outer peripheral edges of said diaphragm member and said seating member, and apertures in said seating member.

2. Invention according to claim 1 wherein said clamping means comprises a pair of large diameter clamping rings, fastening means securing said large diameter clamping rings together with said diaphragm member and said seating member therebetween, a pair of small diameter clamping rings and fastening means securing said small diameter clamping rings together with said diaphragm member and said seating member therebetween.

3. Invention according to claim 2 including, at least two stiffening brackets connecting the large diameter clamping ring and the small diameter clamping ring which are positioned on the side of said valve plug opposite to the side which is positioned on said upstanding seats when seated.

4. Invention according to claim 3 including, a weight for each of said stiffening brackets to determine the pressure differential under which said valve plug will be lifted up from said upstanding seats and means securing said weights to said stiffening brackets.

References Cited in the file of this patent

UNITED STATES PATENTS

| | | |
|---|---|---|
| 1,537,188 | Peters | May 12, 1925 |
| 1,816,205 | Bredermann | July 28, 1931 |
| 1,854,467 | Fourness | Apr. 19, 1932 |
| 2,389,720 | Drane | Nov. 27, 1945 |
| 2,619,113 | Myers | Nov. 25, 1952 |

FOREIGN PATENTS

| | | |
|---|---|---|
| 12,334 | Great Britain | June 22 1895 |